United States Patent
Susanto et al.

(10) Patent No.: US 12,069,093 B2
(45) Date of Patent: Aug. 20, 2024

(54) ARTIFICIAL VIRTUAL MACHINE FOR PREVENTING MALWARE EXECUTION BY APPLYING VIRTUAL MACHINE CHARACTERISTICS IN REAL COMPUTING ENVIRONMENTS

(71) Applicant: Fortinet, Inc., Sunnyvale, CA (US)

(72) Inventors: Jordy Junior Susanto, Coquitlam (CA); Samuel Radiant Tatasurya, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 390 days.

(21) Appl. No.: 17/490,604

(22) Filed: Sep. 30, 2021

(65) Prior Publication Data

US 2023/0096040 A1    Mar. 30, 2023

(51) Int. Cl.
*H04L 9/40* (2022.01)
*G06F 9/445* (2018.01)
*G06F 9/455* (2018.01)

(52) U.S. Cl.
CPC ...... *H04L 63/1491* (2013.01); *G06F 9/44505* (2013.01); *G06F 9/45558* (2013.01); *H04L 63/1416* (2013.01); *H04L 63/145* (2013.01); *G06F 2009/4557* (2013.01); *G06F 2009/45583* (2013.01); *G06F 2009/45587* (2013.01); *G06F 2009/45595* (2013.01)

(58) Field of Classification Search
CPC ............. H04L 63/1491; H04L 63/1416; H04L 63/145; G06F 9/44505; G06F 9/45558; G06F 2009/4557; G06F 2009/45583; G06F 2009/45587; G06F 2009/45595; G06F 21/53; G06F 21/554
USPC .......................................................... 726/22
See application file for complete search history.

(56) References Cited

U.S. PATENT DOCUMENTS

| 9,241,010 B1* | 1/2016 | Bennett ............... H04L 63/1416 |
| 9,430,646 B1* | 8/2016 | Mushtaq ................. H04L 67/02 |
| 2006/0136653 A1* | 6/2006 | Traut ..................... G06F 9/5077 711/6 |
| 2013/0111540 A1* | 5/2013 | Sabin .................... G06F 21/554 726/1 |
| 2020/0382470 A1* | 12/2020 | Butler ................... G06F 21/554 |

OTHER PUBLICATIONS

19. Roccia, Thomas, "Stopping Malware With a Fake Virtual Machine", Jan. 19, 2017, https://www.mcafee.com/blogs/other-blogs/mcafee-labs/stopping-malware-fake-virtual-machine/ (Year: 2017).*

* cited by examiner

*Primary Examiner* — Jacob Lipman
(74) *Attorney, Agent, or Firm* — Law Office of Dorian Cartwright; Dorian Cartwright (57) ABSTRACT

A process being initiated for exposure to an operating system of the computer device is detected. A control module can then check whether the process has been whitelisted, and if not, activate an artificial virtual machine to test the process prior to direct exposure to an operating system of the real computing environment. The control module can detect when the process responds to the presumed virtual environment preventing execution. A security action can then be taken on the process including preventing the process from being exposed to the operating system.

15 Claims, 6 Drawing Sheets

ARTIFICIAL VIRTUAL MACHINE FOR PREVENTING MALWARE EXECUTION BY APPLYING VIRTUAL MACHINE CHARACTERISTICS IN REAL COMPUTING ENVIRONMENTS

FIELD OF THE INVENTION

The invention relates generally to computer networking, and more specifically, to an artificial virtual machine for preventing malware execution by injecting virtual machine characteristic in real computing environments.

BACKGROUND

Figure 1A:
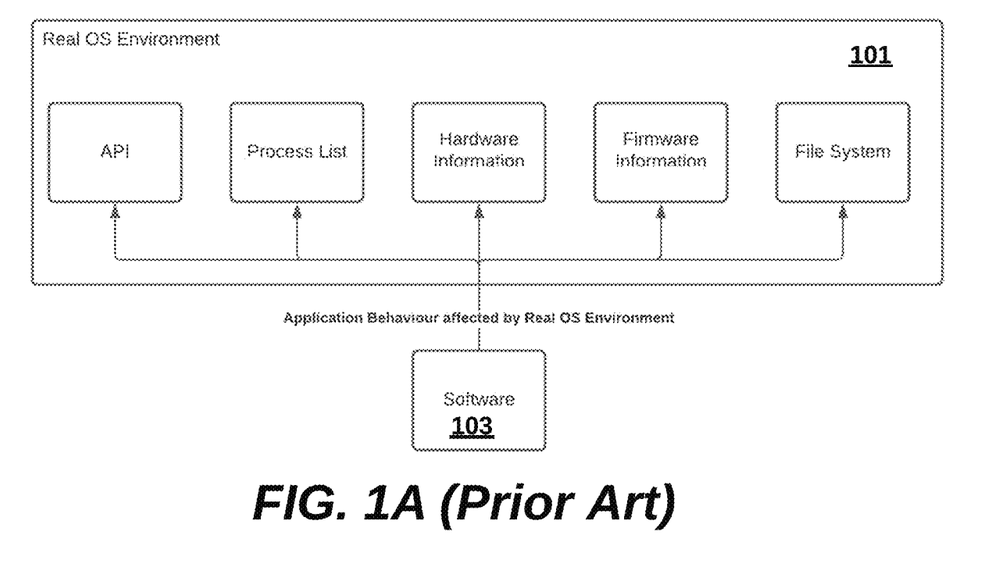
FIG. 1A is a block diagram illustrating a prior art real computing environment, according to an embodiment.
Figure 1B:
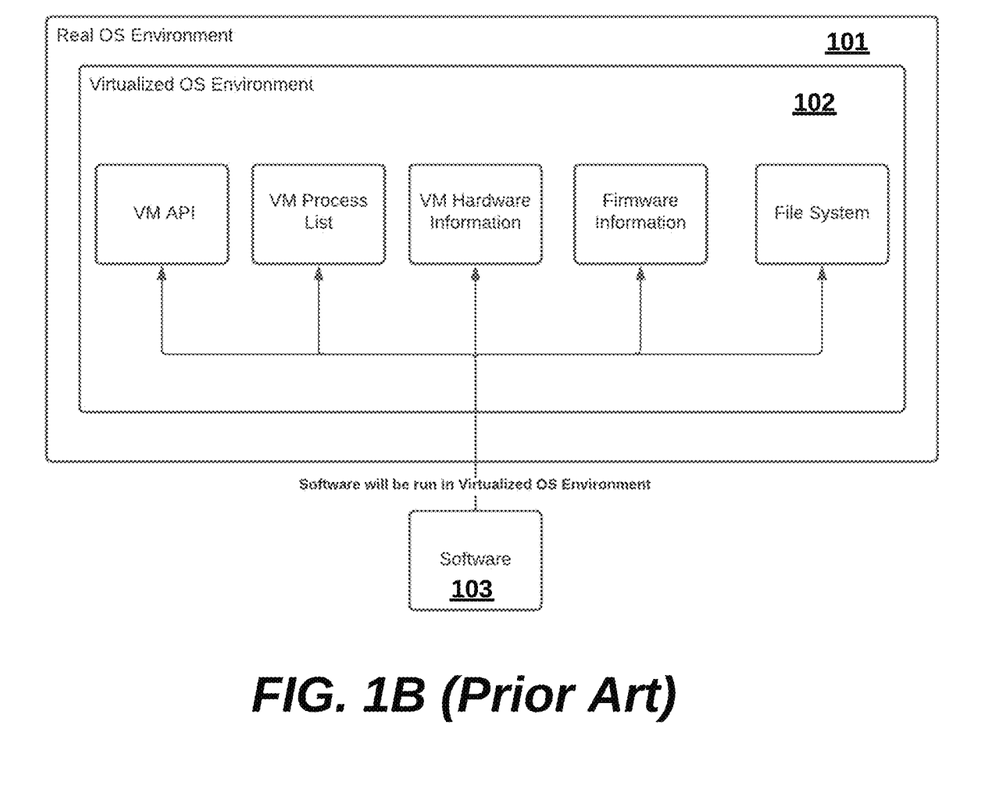
FIG. 1B is a block diagram illustrating a prior art virtual environment withing the real computing environment of FIG. 1A, according to an embodiment.

Malware software 103 can be problematic when exposed directly to a real operating system environment 101 as shown in FIG. 1A. Sandboxing is a cybersecurity mechanism to achieve zero-day malware detection for those that have yet to be characterized by services. By subjecting malware software 103 to run in a virtualized environment 102 as shown in FIG. 1B, its behaviors can be monitored and analyzed for possible suspicious activities.

However, malware authors are aware of this fact, so they implement checks within the malware to evade analysis by sandboxing solutions, which are collectively known as anti-virtual-machine (anti-VM) techniques. If the malware 103 successfully detects that it is running in a virtualized environment, it will deviate from its original malicious code execution or even stop running entirely.

Therefore, what is needed is a robust technique for preventing malware execution by injecting virtual machine characteristics in a real computing environment of the computer device.

SUMMARY

These shortcomings are addressed by the present disclosure of methods, computer program products, and systems for preventing malware execution by injecting virtual machine characteristics in a real computing environment of the computer device.

In one embodiment, a daemon can detect a process being initiated for exposure to an operating system of the computer device. A control module can then check whether the process has been whitelisted, and if not, activate an artificial virtual machine to test the process prior to direct exposure to an operating system of the real computing environment.

In another embodiment, virtual machine parameters for an artificial virtual machine for the process are injected to a real computing environment. In general, the virtual machine parameters simulate execution of an actual virtual machine in a virtual environment, for the real computing environment. The control module can detect when the process responds to the presumed virtual environment preventing execution. A security action can then be taken on the process including preventing the process from being exposed to the operating system.

Advantageously, computer hardware performance is improved with enhanced malware security.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for providing proxy encryption services for preventing malware execution by injecting virtual machine characteristics in a real computing environment of the computer device.

One of ordinary skill in the art will recognize many additional variations made possible by the succinct description of techniques below.

I. Systems for Preventing Malware Execution with Artificial Virtual Machines (FIGS. 1-2)

Figure 2:
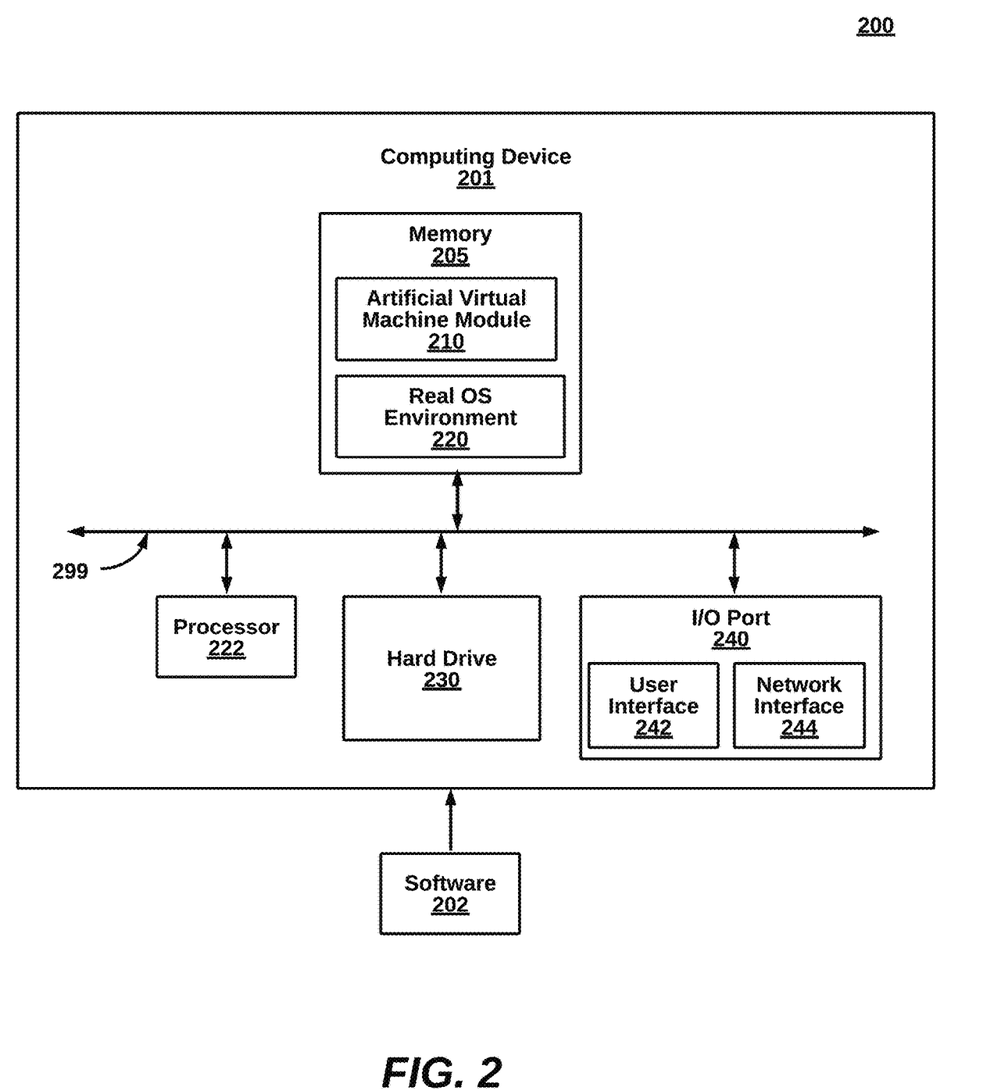
FIG. 2 is a high-level block diagram illustrating a computing device providing proxy encryption services for preventing malware execution by injecting virtual machine characteristics in a real computing environment of the computer device, according to an embodiment.

FIG. 2 is a high-level illustration of a system 200 for preventing malware execution by injecting virtual machine characteristics in a real computing environment, according to an embodiment. A computing device 201, of the present embodiment, includes a memory 205, a processor 222, a storage drive 230, and an I/O port 240. Each of the components is coupled for electronic communication via a bus 299. Communication can be digital and/or analog and use any suitable protocol. The computing device 201 can be a networking device (e.g., an access point, a firewall device, a gateway, a router, or a wireless station), or a disconnected device.

The software 202 can be computer code loaded into the computing device 201 from a data communication network, a Wi-Fi network, a hard disk, a thumb drive, a floppy disk, or the like. In one case, the software 202 is code downloaded to a hard drive from a network, and later loaded from the hard drive to RAM in preparation for execution by a processor.

An artificial virtual machine module 210 within the computing device 201 injects virtual machine characteristics of a virtual OS environment into the real OS environment, prior to executing the software 202. If the software 202 avoids executing because of the virtual machine characteristics, a security action can be taken to prevent harm to the computing device 201. For example, the software 202 can be automatically deleted, quarantined, sandboxed, or analyzed. In another example, a network administrator or user can be notified to take a manual action. If the software 202 does execute despite virtual machine characteristics, in one case, it is trusted and whitelisted for subsequent runtimes. Another case continues interrogating the software 202 under additional software security or network security measures. In an embodiment, the artificial virtual machine module 210 is supported by a remote server that provides updates, for instance, specific virtual machine characteristics for specific processes. More detail about the artificial virtual machine module 210 is provided below with respect to FIG. 3.

A real OS environment 220 within the computing device 201 executes software, processes. Standard components of the real OS environment 220 include an API module, a process list, a hardware information module, a firmware information module, and a file system. The artificial virtual machine module 210 injects virtual machine information including virtual machine APIs, virtual machine processes, virtual machine hardware information, virtual machine firmware information, and virtual machine files into the standard components. In one embodiment, a virtual environment can be segregated within the real OS environment 220. The real operating system 220 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The computing device 201 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The memory 210 further comprises network applications 612 and an operating system 214. The network applications 612 can include a web browser, a mobile application, an application that uses networking, a remote application executing locally, a network protocol application, a network management application, a network routing application, or the like.

The processor 222 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 222 can be single core, multiple core, or include more than one processing elements. The processor 620 can be disposed on silicon or any other suitable material. The processor 222 can receive and execute instructions and data stored in the memory 222 or the storage drive 230.

The storage drive 230 can be any non-volatile type of storage such as a magnetic disc, EEPROM (electronically erasable programmable read-only memory), Flash, or the like. The storage drive 230 stores code and data for applications.

The I/O port 240 further comprises a user interface 242 and a network interface 244. The user interface 642 can output to a display device and receive input from, for example, a keyboard. The network interface 244 (e.g., an RF antennae) connects to a medium such as Ethernet or Wi-Fi for data input and output. Many of the functionalities described herein can be implemented with computer software, computer hardware, or a combination.

Figure 3:
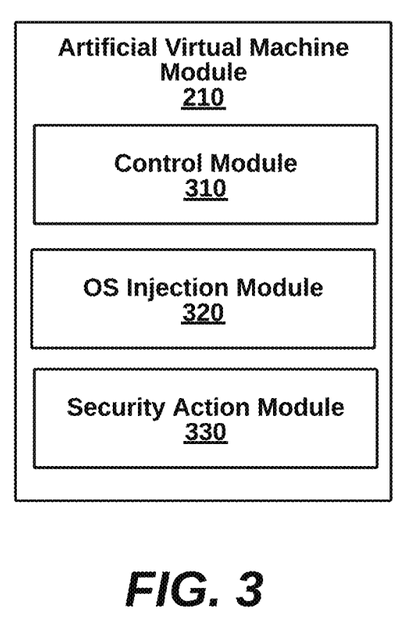
FIG. 3 is a more detailed block diagram illustrating of an artificial virtual machine module of the system of FIG. 1, according to an embodiment.

FIG. 3 is a more detailed illustration of an artificial virtual machine module 210 of the system 200 of FIG. 1. The artificial virtual machine module includes a control module 310, an OS injection module 320 and a security action module 330. The modules can be implemented in source code stored in non-transitory memory executed by a processor. Alternatively, the modules can be implemented in hardware with microcode. The modules can be singular or representative of functionality spread over multiple components. Many other variations are possible.

The control module 310, in an embodiment, detects a process being initiated for exposure to an operating system of the computer device that has not been whitelisted. Monitoring can be from a daemon or other background process with hooks in the operating system. Calls to the operating system can be intercepted and evaluated to determine if a process is requesting resources for runtime. In certain cases, the artificial virtual machine security function can be bypassed and processes are exposed directly to the operating system. Whitelists can be updated by the control module 310 and other mechanisms. In still other cases, a full sandbox operation or other interrogation may be necessary rather than an artificial virtual machine.

The OS injection module 320 can inject virtual machine parameters for an artificial virtual machine for the process to the real computing environment. The virtual machine parameters simulate execution of an actual virtual machine in a virtual environment. There can be different virtual machine parameters for different types of processes, different levels of threat, and different local conditions.

Virtual machine characteristics can include specific files, processes, operating system configuration and settings, processor instructions, operating system APIs, and other environmental characteristics. These characteristics can be copied from actual virtual machine environments or characteristics can designed for the purpose. One embodiment adjusts virtual machine characteristics for different malware testing (e.g., certain types of malware may look for certain characteristics). A. Files. Some files, such as dynamic libraries and system drivers, are included by virtual machine developers as part of virtualization. The existence of such artifacts may signal to processes that the environment is not a real computing environment. B. Processes. A virtual environment normally launches helper processes to assist its virtualization strategy, which are not typically found in real computing environments. If such processes are found to be running, it can be a strong indicator that the environment is under virtualization. C. Operating System Configuration and Settings. OS configuration and settings in any form are not commonly found in a real computing environment and remain inside a virtual machine. For example, on Windows operating system, configuration information is commonly stored in a hierarchical structure called Windows registry. A virtualized environment may store its settings as registry entries, which can be queried at a later time. D. Processor Instructions. Certain processor instructions behave differently in a virtual machine and a real computing environment. For example, CPUID instruction on x86-based processors can be used to check specific processor bands and the presence of a hypervisor. In addition, the amount time taken between RDTSC instruction calls can be used to deduce whether the program is running under a virtual or real computing environment. E. Operating System APIs. Software utilizes APIs to interact with the underlying operating system. Some APIs may give out system information that is commonly encountered in a virtualized environment, such as using GetTickCount on Windows operating system to check the system uptime, while some others may return different results when running in a virtual machine, such as IsNativeVhdBoot on Windows operating system. Moreover, a virtualized environment may introduce unique APIs which do not exist in a real computing environment, such as wine_get_unix_file_name on Wine. F. Other Environmental Characteristics. Other features and behaviors may come from user-adjusted settings during preparation of the virtual machines, such as number of processors, the amount of memory, and the size of storage. Some features and behaviors come directly from virtual machine vendors, such as media access control addresses starting with a specific sequence. Many other virtual machine characteristics are possible.

Figure 4:
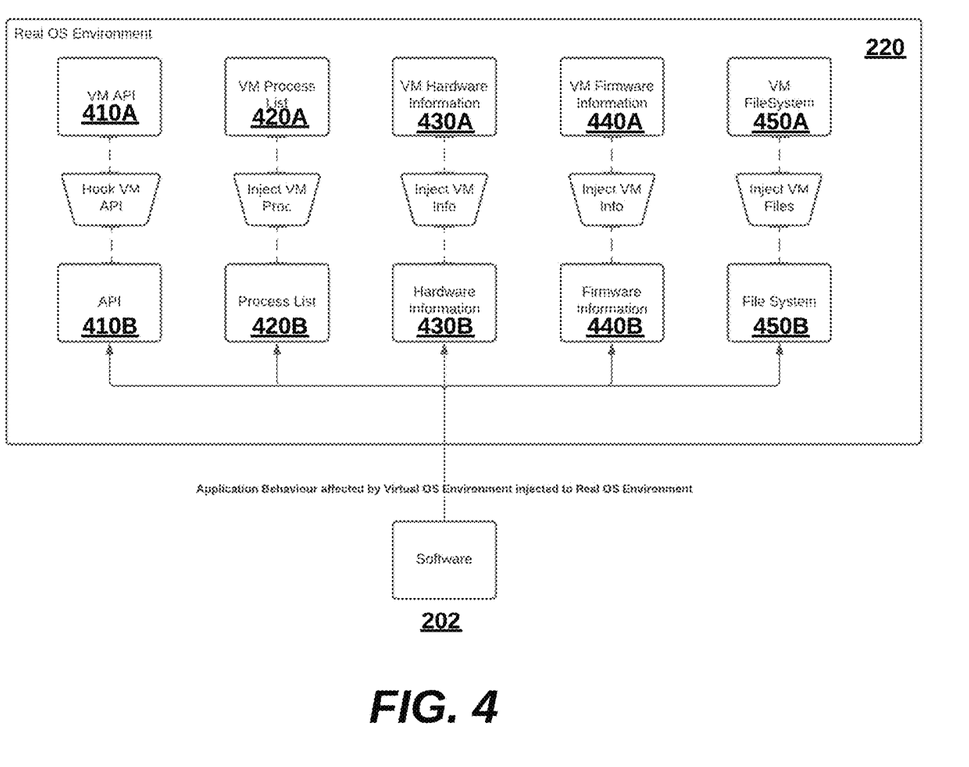
FIG. 4 is a more detailed illustrating a real OS environment of the system of FIG. 1, according to some embodiments.

The virtual machine parameters are shown in situ in FIG. 4, according to an embodiment. Virtual machine APIs 410A are hooked into the API 410B, for access by unsuspecting processes checking for virtual machines prior to executing. Similarly, a virtual machine process list 420A is injected to a process list 420B, virtual machine information 430A is injected to hardware information 430B, virtual machine firmware information 440A is injected to firmware information 440B, and virtual machine files are injected from a virtual machine file system 450A to file system 450B.

Referring again to FIG. 3, the security action module 330 to take a security action on the process including preventing the process from being exposed to the operating system. More specifically, when the process does not execute responsive to the process detecting the virtual machine parameters of the artificial virtual machine, the process can be considered suspicious. Anti-sandboxing or anti-virtual machine techniques may have been triggered. One embodiment initiates additional security features to investigate more thoroughly.

II. Methods for Preventing Malware Execution with Artificial Virtual Machines (FIGS. 5-6)

Figure 5:
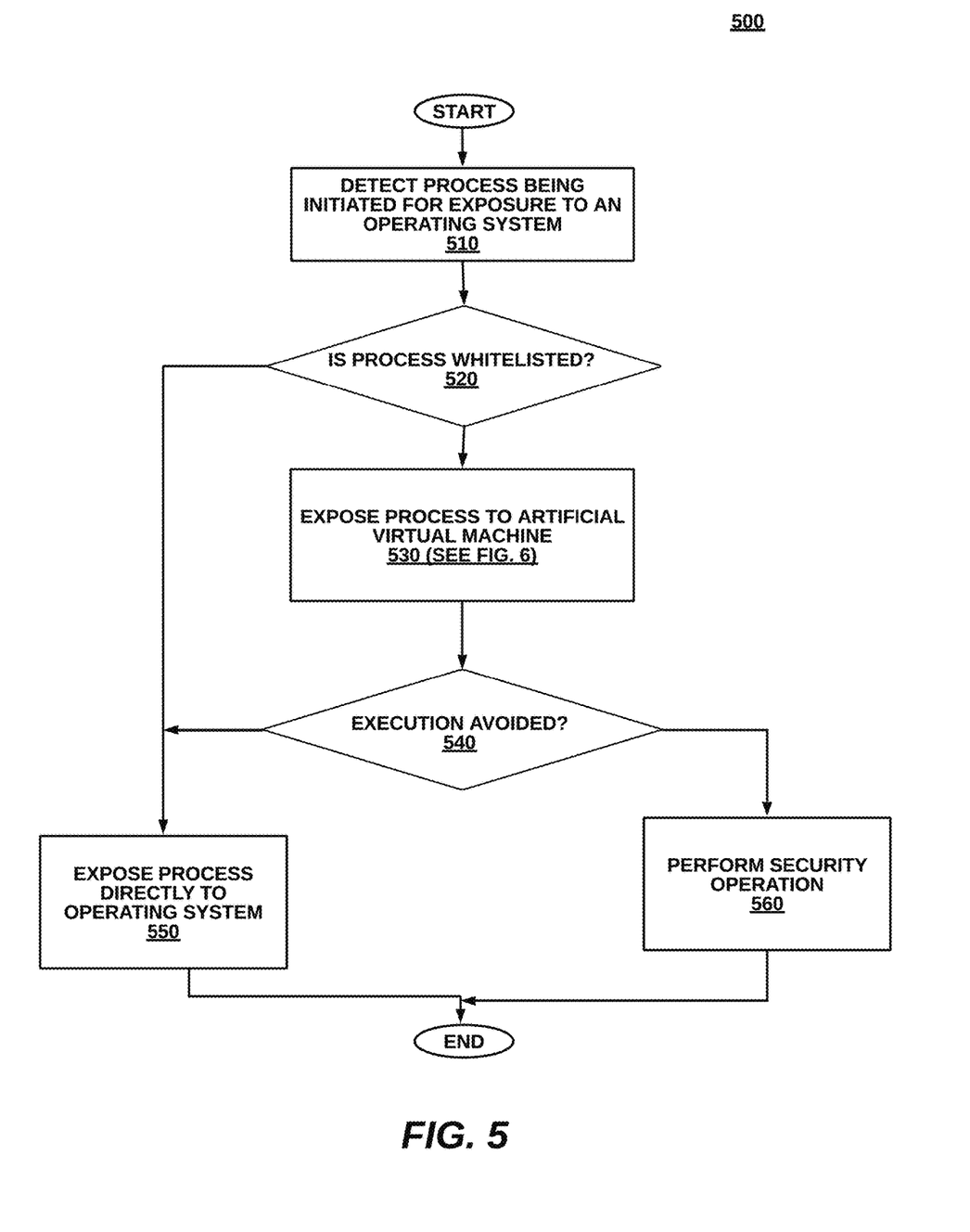
FIG. 5 is a high-level flow diagram illustrating a method for providing proxy encryption services for preventing malware execution by injecting virtual machine characteristics in a real computing environment of the computer device, according to one preferred embodiment.

FIG. 5 is a high-level flow diagram illustrating a method for preventing malware execution by injecting virtual machine characteristics in a real computing environment of the computer device, according to one embodiment. The method 500 can be implemented, for example, by the system 100 of FIG. 1. The steps are merely representative groupings of functionality, as there can be more or fewer steps, and the steps can be performed in different orders. Many other variations of the method 500 are possible.

At step 510, a process is detected being initiated for exposure to an operating system of the computer device. At step 520, a control system can determine whether to initiate the artificial virtual machine or to bypass the runtime security operation for direct exposure to the operating system. At step 530, the process is exposed to the artificial virtual machine, as described in FIG. 6. Processes that pass muster of the artificial virtual machine may then be exposed to the operating system at step 540 and, processes that do not pass muster, are subjected to additional security measures at step 550. In one embodiment, artificial virtual machine exposure at step 530 is only a first security step to detect anti-virtual machine or anti-debut techniques, followed by additional cybersecurity measures of payload content.

Figure 6:
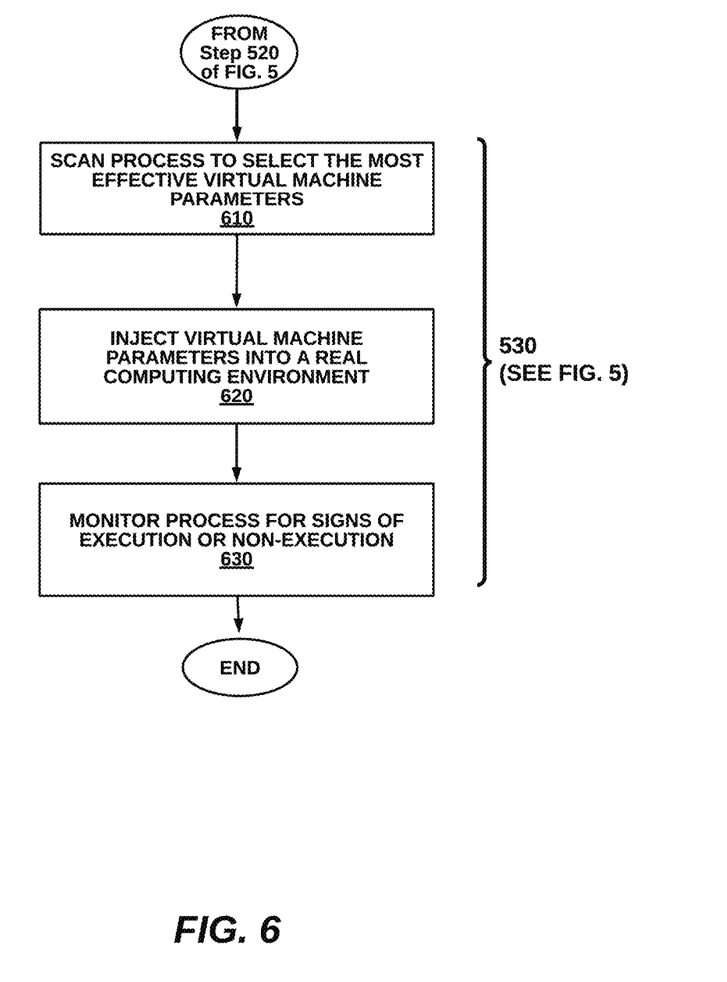
FIG. 6 is a more detailed flow diagram illustrating the step of exposing a process to an artificial virtual machine, for the method of FIG. 5, according to one embodiment.

FIG. 6 illustrates sub steps of the artificial virtual machine exposure step of 530. At step 610, a process can be scanned to select the most effective virtual machine parameters. At step 620, an artificial virtual machine module can inject virtual machine parameters for an artificial virtual machine to the real computing environment. The virtual machine parameters simulate execution of an actual virtual machine in a virtual environment. At step 630, a control module monitors the process for signs of execution or non-execution, under the guise that non-execution is a sign of potentially malicious software.

III. Generic Computing Environment

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer ⅔ routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. An artificial virtual machine in a computer device for preventing malware execution by applying virtual machine characteristic in real computing environments, the computer device comprising:
   a processor; and
   a memory, communicatively coupled to the processor and storing:
      a control module to detect a process being initiated for exposure to an operating system of the computer device, wherein the computer device has not been whitelisted;
      an OS injection module, to receive a signal from the control module for injecting virtual machine parameters of an artificial virtual machine for the process to the real computing environment, prior to runtime for the process, the virtual machine parameters simulating execution of an actual virtual machine in a virtual environment to the process,
      wherein the control module detects that the process does not execute responsive to the process detecting the virtual machine parameters of the artificial virtual machine; and
      a process security module to take a security action on the process including preventing the process from being exposed to the operating system, responsive to detection of non-execution, and allowing the process exposure to the operating system, responsive to not detecting non-execution.

2. The computing device of claim 1, wherein the computing device is a network computing device coupled to a data communication network, and the process is downloaded from the data communication network for execution on the network computing device.

3. The computing device of claim 1, wherein the virtual machine parameters are based on characteristics and behaviors of the actual virtual machine.

4. The computing device of claim 1, wherein the memory further comprises a virtual environment module to virtualize a computing environment sandboxed within the real computing environment, to execute the process without exposure to the real computing environment.

5. The computing device of claim 1, wherein the virtual machine parameters comprise at least one selected from: virtual machine files, virtual machine processes, virtual machine operating system configuration and settings, virtual machine processor instructions, and virtual machine operating machine APIs.

6. The computing device of claim 1, wherein the virtual machine parameters comprise at least one dynamic library or at least one system driver.

7. The computing device of claim 1, wherein the virtual machine parameters comprise registry entries.

8. The computing device of claim 1, wherein the virtual machine parameters comprise a CPUID instruction on an x86-based processor.

9. The computing device of claim 1, wherein the control module updates a whitelist responsive to the process executing after exposure to the virtual machine parameters.

10. The computing device of claim 1, wherein the computing device notifies a remote server responsive to the process not executing after exposure to the virtual machine parameters.

11. The computing device of claim 1, wherein the virtual machine parameters comprise one or more operating system APIs.

12. The computing device of claim 11, wherein one or more operating system APIs comprise an IsNativeVhdBoot API.

13. The computing device of claim 12, wherein one or more operating system APIs a wine_get_unix_file_API.

14. A method for using an artificial virtual machine in a computer device for preventing malware execution by injecting virtual machine characteristics in a real computing environment of the computer device, the method comprising the steps of:
   detecting a process being initiated for exposure to an operating system of the computer device, wherein the computer device has not been whitelisted;
   injecting virtual machine parameters for an artificial virtual machine for the process to the real computing environment, the virtual machine parameters simulating execution of an actual virtual machine in a virtual environment;
   detecting that the process does not execute responsive to the process detecting to the virtual machine parameters of the artificial virtual machine; and
   responsive to the process not executing, taking a security action on the process including preventing the process from being exposed to the operating system, and allowing the process exposure to the operating system, responsive to not detecting non-execution.

15. A non-transitory computer-readable media in a computer device, implemented at least partially in hardware for, storing source code that, when executed by a processor, performing a method for preventing malware execution by injecting virtual machine characteristics in a real computing environment of the computer device, the method comprising the steps of:

detecting a process being initiated for exposure to an operating system of the computer device, wherein the computer device that has not been whitelisted;

injecting virtual machine parameters for an artificial virtual machine for the process to the real computing environment, the virtual machine parameters simulating execution of an actual virtual machine in a virtual environment;

detecting that the process does not execute responsive to the process detecting to the virtual machine parameters of the artificial virtual machine; and responsive to the process not executing, taking a security action on the process including preventing the process from being exposed to the operating system, and allowing the process exposure to the operating system, responsive to not detecting non-execution.

* * * * *